Sept. 6, 1966  J. H. DE CLAIRE  3,270,840
POWER OPERATED PARKING BRAKE HAVING AN AUTOMATIC
TRANSMISSION CONTROL GEAR SHIFT RELEASE
Filed Aug. 12, 1964  2 Sheets-Sheet 2
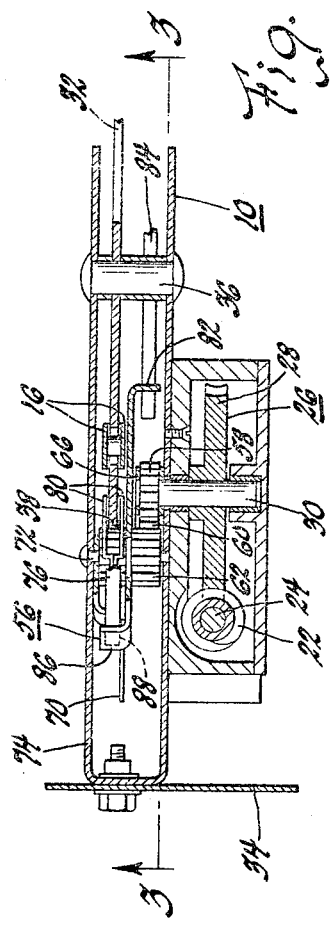
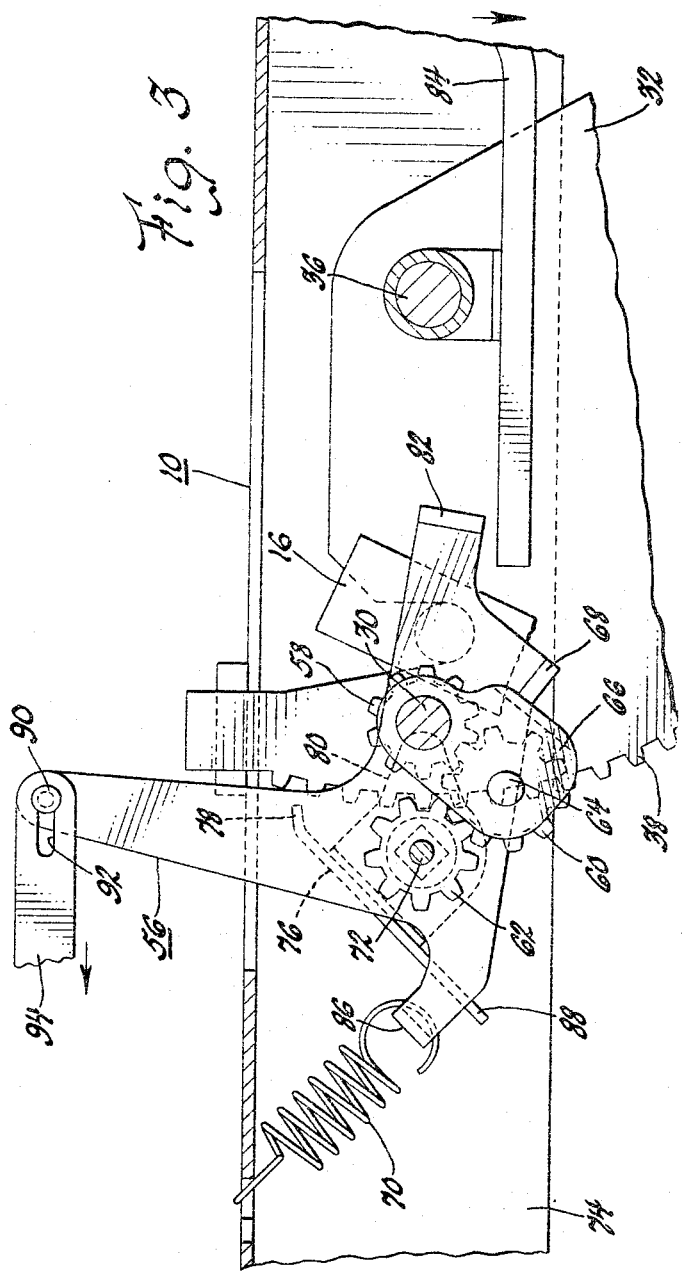
INVENTOR.
James H. DeClaire
BY
O. D. McGrew
HIS ATTORNEY United States Patent Office 3,270,840
Patented Sept. 6, 1966

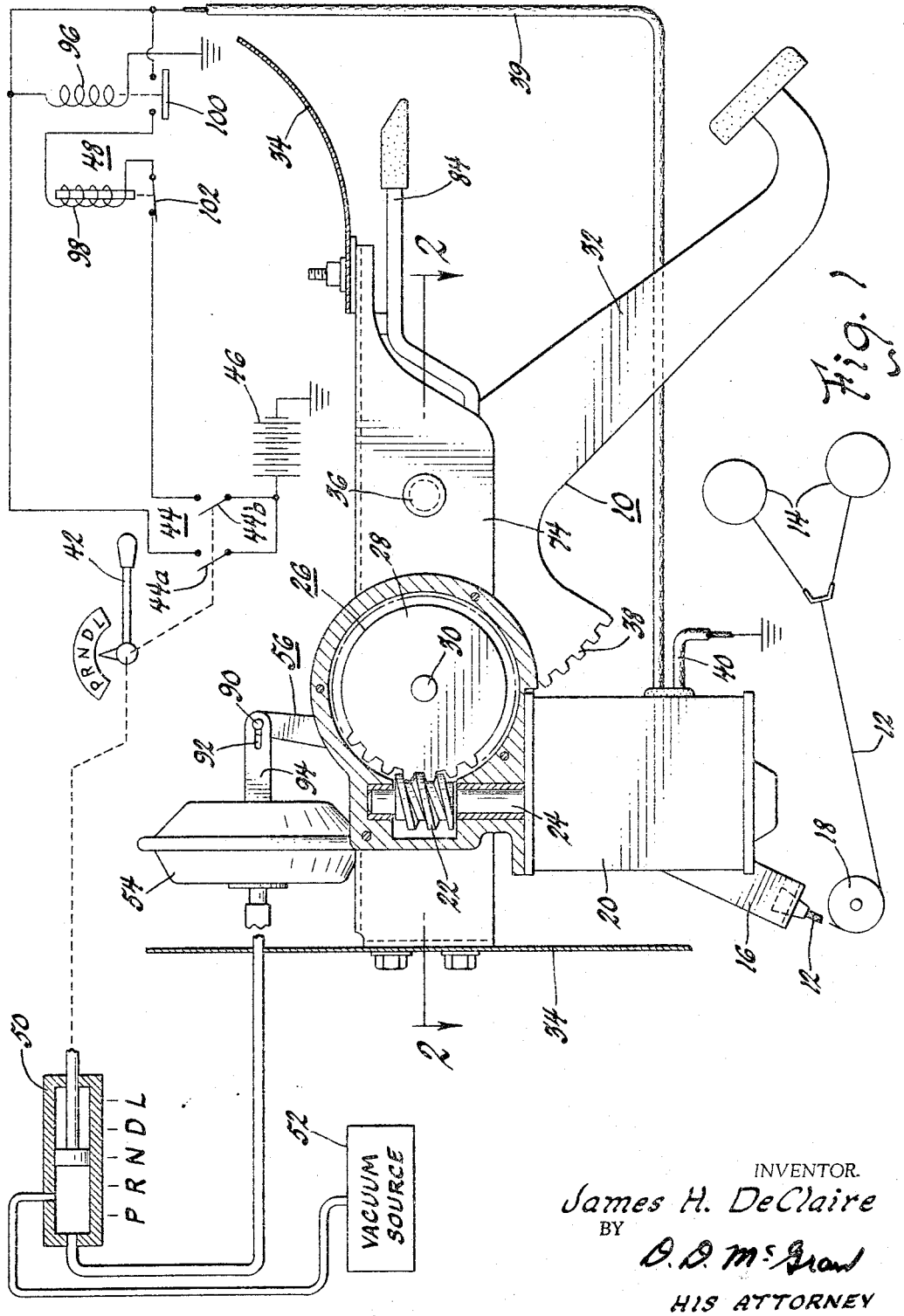

3,270,840
POWER OPERATED PARKING BRAKE HAVING AN AUTOMATIC TRANSMISSION CONTROL GEAR SHIFT RELEASE
James H. De Claire, East Detroit, Mich., assignor to General Motors Corporation, Detroit, Mich., a corporation of Delaware
Filed Aug. 12, 1964, Ser. No. 389,047
8 Claims. (Cl. 192—4)

This invention relates to vehicle parking brakes and more particularly to parking brake mechanisms that are power operated under certain operating conditions and manually operated under other operating conditions.

It is common in the design of parking brakes for automobiles to have a power release mechanism connected therewith. However, power braking mechanisms that are actuated under power as well as released automatically are not well known in the art. In addition, under certain operating conditions, it is desirable to have a manual actuation capability for parking brakes that are partially powered in operation. It is also desirable to provide a vehicle parking brake that cannot be inadvertently left engaged while a vehicle is driven from a parked position.

It is an object of the present invention to provide an improved parking brake mechanism that is automatically actuated and released under certain operating conditions and manually actuatable and releasable under other operating conditions.

It is another object of the present invention to provide an improved parking brake mechanism that is automatically actuated when a transmission control lever of a vehicle is placed in a selected position and is automatically released when the transmission control lever is placed in any other position.

It is still another object of the present invention to provide an improved parking brake mechanism that is operable manually while the transmission control lever is in the neutral position.

It is yet another object of the present invention to provide an improved parking brake mechanism that is driven to an actuated position automatically by an electric motor operating positively through a gear train and is automatically locked in the actuated position when sufficient back pressure exists in the braking system to shut off the actuating mechanism.

It is a further object of the present invention to provide an improved parking brake mechanism which simultaneousely disengages the gear train utilized for power actuation and unlocks the brake mechanism when a transmission control lever is placed into a position where motion of the vehicle is intended.

It is still a further object of the present invention to provide an improved parking brake mechanism that is manually actuatable and manually releasable so as to provide an emergency brake or to allow towing of the vehicle.

Further objects and advantages of the present invention will be apparent from the following description, reference being had to the accompanying drawings wherein a preferred embodiment of the present invention is clearly shown.

In the drawings:

FIGURE 1 illustrates a sectional and elevational view of the subject invention shown in an operative environment that is depicted diagrammatically;

FIGURE 2 is a sectional view taken along line 2—2 of FIGURE 1;

FIGURE 3 is an elevational view taken along line 3—3 of FIGURE 2.

Referring now to FIGURE 1, a parking brake mechanism, generally designated by the numeral 10, is shown diagrammatically engaging cable 12 arranged to energize brakes of a conventional type acting on wheels 14. The wheels 14 could be, for example, the rear wheels of a vehicle. Typically, when the cable 12 connected to a strap 16 is drawn in a clockwise fashion around a pulley 18, brakes in wheels 14 are energized.

The system shown in FIGURE 1 is energized by an electric motor 20 having a worm gear 22 attached to an output shaft 24. The worm gear 22 engages a drive means 26 comprising a large gear 28 rotatable on a shaft 30 and mounted to a fixed portion of the vehicle. It is understood that the large gear 28 is described as such due to its relative size to gears associated therewith to be hereinafter described.

A brake pedal 32 is pendantly supported by a fixed portion of the vehicle 34 and is arranged to rotate about a pivot 36. A sector gear 38 is formed integrally with the brake pedal 32 and takes a generally arcuate shape around the pivot 36. The brake pedal 32 is, therefore, similar to brake pedals of common design having a sector gear integral thereto and is, consequently, compatible with automobiles of common design.

The electric motor 20 is controlled through electric leads 39 and 40 connected to switching mechanism and ground, respectively. The energization of the motor 20 is accomplished by movement of a transmission control lever 42 to a park position commonly found on automatic transmissions in general usage. The switching is accomplished in any well-known manner in which a switch 44 completes a circuit from a battery 46 to a switching arrangement, generally designated by the numeral 48. The electrical control mechanism is not meant to be a part of the present invention except as the transmission control lever operated switch initiates the parking brake actuation when the control lever is moved to a selected position.

The transmission control lever 42 is likewise linked to a vacuum valve 50 in a manner allowing the vacuum from a vacuum source 52 to be routed to a vacuum actuator 54 when the transmission control lever 42 is in any position but the park position. It is evident then that the vacuum actuator 54 is energized when the selector lever 42 is moved into a position where movement of the car is desired by the vehicle operator. It should be noted that the designation of the control valve 50 as a vacuum valve is illustrative alone and the invention would work as well if the actuator 54 were not vacuum controlled but controlled by any medium that will induce an appropriate pivoting movement in a bell crank 56.

Referring now to FIGURE 2, the worm gear 22 is shown meshed with a large gear 28. The large gear 28 is keyed to the shaft 30 so as to be non-rotatable with respect to the shaft 30. A second gear or pinion 58 is likewise keyed to the shaft 30 and rotates with the gear 28 when it is driven by the worm gear 22. A third gear 60 serves as a linking drive means between the second gear 58 and a fourth gear 62.

Referring now to FIGURE 3, the relative position of the third gear 60 is more clear and it is noted that the gear 60 is rotatable on a shaft 64 carried by a strap 66 that in turn is pivotable on the same axis as the shaft 30. An abutment 68 on the bell crank 56 serves to urge the strap 66 carrying the gear 60 in a clockwise fashion around the shaft 30 during periods of time when pressure from a spring 70 is the only force acting on the bell crank 56. It is noted that the gear 60 constantly engages the gear 58 and, when the abutment 68 drives the linking gear 60 into engagement with the gear 62, a gear train is made complete between the worm gear 22 and the sector gear 38. The gear 62 is essentially an idler gear during periods of time when the linking gear 60 is not in engagement therewith and merely follows the sector gear 38 in its movement.

Referring now to FIGURE 2, it is noted that the gear 62 is split into two geared portions and a bearing portion in its center. The bell crank 56 is arranged to rotate in this bearing portion in the center of the gear 62. The gear 62 is freely rotatable on a shaft 72 that is mounted between two opposed portions of a bracket 74, sometimes referred to herein as a fixed portion of the vehicle. A pawl 76 is rotatable around the shaft 72 and has an end 78 adapted to engage the teeth of the sector gear 38. The pawl 76 has a plurality of extended spring fingers 80 adapted to frictionally engage the sides of the sector gear 38. These spring fingers serve to maintain the pawl end 78 out of engagement with the sector gear 38 during operating conditions when the sector gear 38 moves in a clockwise fashion about the pivot 36 during a brake actuation. The relationship of the pawl 76 and the spring fingers 80 is also shown in FIGURE 3 and illustrated therein is the substantially bell crank shape of the spring fingers 80 in its pivotal mounting on the shaft 72. This frictional engagement of the spring fingers 80 with the sector gear 38 serves as a silencing means for the pawl during a sector gear movement in that the pawl end 78 is levered out of engagement with the teeth of the sector gear 38 during an actuating movement thereof and is later levered into holding engagement with the sector gear 38 when the sector gear 38 moves in a counterclockwise direction after an actuation.

An extended flange 82 from the bell crank 56 is positioned so as to be engaged by a brake release lever 84 as it is moved in a clockwise fashion about the pivot 36 on which it is mounted. It is clear from an examination of FIGURE 3 that the lever 84, when pivoted in a clockwise manner on the pivot 36, will engage the bell crank 56 and pivot said bell crank in a counterclockwise manner on its pivotal mounting on the gear 62 against the tension of the spring 70. It should be noted that the bell crank 56 has an offset flange 86 engaging the spring 70 as well as providing an abutment position to engage an end 88 of the pawl 76 during a counterclockwise movement of the bell crank 56 thereby disengaging the end 78 of the pawl 76 from the sector gear 38.

It should also be noted that the linking gear 60 and the idler gear 62 are positioned in such a manner that rotating gear 60 tends to disengage itself from the gear 62 during periods of time when the abutment 68 of the bell crank 56 is not bearing against the edge of the strap 66. It therefore becomes obvious that the lever 84, when pivoted in a clockwise manner about the pivot 36, accomplishes a disengagement of the pawl 76 from the sector gear 38 and also releases the linking gear 60 from engagement with the idler gear 62, thereby interrupting the gear train previously described.

In operation, referring to FIGURE 1, it will be assumed that the transmission selector lever 42 is in a neutral position, thereby deenergizing the power portion of the parking brake. Under this operating condition, an actuation of the brake is brought about in a conventional manner by the application of force to the brake pedal 32. The brake pedal 32 will pivot in a clockwise manner about the pivot 36, thereby drawing the strap 16 and the cable 12 in the direction of the upper portion of the sector gear 38.

Referring to FIGURE 3, as the ratchet gear 38 moves in a clockwise fashion, the spring fingers 80 frictionally engage the side of the ratchet gear 38 and tend to pivot the pawl in a counterclockwise fashion around the shaft 72. This serves to maintain the end 78 of the pawl 76 out of engagement with the teeth of the sector gear 38, thereby allowing a silent movement of the sector gear 38 past the associated mechanism during an actuating movement of the pedal 32. When sufficient back pressure from the vehicle brakes overcomes the force exerted on the pedal 32, a slight release of the pressure against the pedal 32 will result in a counterclockwise movement of the pedal 32. Due to the frictional engagement of the spring fignres 80 with the sector gear 38, the end 78 of the pawl 76 will be very quickly pivoted into engagement with one of the teeth of the sector gear 38, thereby locking the sector gear against any further movement in a counterclockwise direction. The brake is therefore held in an actuated condition and operates as a parking brake for a vehicle to prevent any casual movement thereof.

Referring to FIGURE 3, when it is desired to release the brake, the lever 84 is rotated in a clockwise manner about the pivot 36. The lever 84 will engage the flange 82 on the bell crank 56 causing the bell crank 56 to move in a counterclockwise manner on its mounting on the gear 62. This movement will take place after the force of the spring 70 is overcome. The offset flange 86 of the pivoting bell crank 56 will contact the end 88 of the pawl 76, driving it out of engagement with the sector gear 38. The back pressure from the vehicle brakes operating against the upper end of the sector gear 38 will pivot the brake pedal 32 counterclockwise into a poised position. It should be noted that, during this cycle of operation, the gear 62 will freewheel on the sector gear 38 and, therefore, the gear train, during actuation, will be driven by the actuating movement of the pedal 32 and, on the release motion, will be disengaged in a conventional manner.

The automatic cycling of the subject device is initiated by starting the engine on a vehicle, for example, and placing the transmission control lever 42 into the park position. This movement of the lever 42 performs two functions in the system described herein. First, the vacuum control valve 50 is positioned so that the vacuum pressure between the source 52 and the actuator 54 is cut off. Referring now to FIGURE 1, a pin 90 carried by the bell crank 56 cooperates with a slot 92 formed in an output lever 94 of the vacuum actuator 54. Therefore, it is seen that the bell crank 56 is free to move while the output lever 94 is positioned in a fixed manner due to the trapped vacuum pressure between the valve 50 and the actuator 54.

Second, the movement of the transmission control lever 42 into the park position closes the switch 44 disposed in an electrical circuit betwen the battery 46 and the switching arrangement 48. Switch 44 is a double pole switch, one pole energizing the electric motor 20 and another pole energizing a relay 96 and a current responsive relay 98. The relay 96 will immediately close and the relay 98 is normally closed but is responsive to the load on the motor 20.

The motor 20 causes the shaft 24 and the worm gear 22 to rotate. This rotation is transmitted to the drive means, generally designated by 26, which involves the rotation of the gear 28 and the shaft 30. As seen in FIGURE 2, the second gear 58 rotates with the first gear 28 at the same rotational speed. As previously stated, when the bell crank 56 is maintained in its poised position by the force of the spring 70, the abutment 68 maintains the third gear 60 in engagement with the fourth gear 62.

Referring to FIGURE 3, the fourth gear 62 is always in engagement with the teeth of the sector gear 38. Therefore, the electric motor 20 through the gear train drives the sector gear 38 in a clockwise or brake apply direction. The strap 16 and the cable 12, connected to the upper end of the sector gear 38, apply the brakes to the wheels 14. The frictional engagement of the fingers 80 on the sector gear 38 will pivot the pawl 76 in a counterclockwise manner and hold the end 78 of the pawl 76 out of engagement with the sector gear 38 during an apply movement of the sector gear. This results in a silencing of the clicking noise normally associated with a pawl and ratchet actuation.

When the brake is applied so that a back pressure exists against the sector gear 38, the motor 20 will start to draw more of a load. Referring to FIGURE 1, the current responsive or load relay 98 will open, thereby shutting off power to the motor 20. Thereafter, the back pressure from the applied brakes will tend to draw the sector gear 38 in a counterclockwise fashion. The pawl 76 will follow due to the frictional engagement of the spring fingers 80 with the sector gear 38. The end 78 of the pawl 76 will engage the sector gear 38 preventing any further counterclockwise movement thereof. If the engine is left running, the current responsive relay 98 may oscillate slightly as the decrease in load would allow the relay 98 to close, thereby attempting to start the motor. The back pressure, however, from the braking system in the applied position would be too great a load for the motor to overcome and relay 98 would immediately open. Normally, however, when the transmission control lever 42 is placed in the park position, the ignition is turned off, thereby deenergizing the electrical circuit.

If it is desired to eliminate this hunting of the relay 98 as the brake is applied with the ignition switch on, relay 96 can act as a holding relay to hold a switch 100 in the open position. It is understood that pole 44a of switch 44 makes a momentary contact and pole 44b is a permanent contact. Switch 100 is normally closed as power is supplied through the ignition switch 44 and stays closed until the load responsive relay 98 opens a switch 102. This deenergizes the relay 96 and the switch 100. Thereafter, the relay 98 can close but current to the motor 20 is interrupted by the open switch 100 and the cycle is ended until the transmission control lever 42 is recycled into the park position.

The subject parking brake mechanism has the added feature of being automatically releasable when the transmission control lever 42 is moved from the park position with the engine running. In this situation, the switch 44 is deenergized and the vacuum control valve 50 is opened, thereby making the vacuum actuator 54 responsive to a vacuum pressure from the vacuum source. The output lever 94 of the actuator 54 is drawn in the direction of the actuator 54. The engagement of the slot 92 with the pin 90 will draw the bell crank 56 in a counterclockwise fashion about its pivotal mounting on the gear 62. Thereafter, the cycle will be continued in the manner previously described for the manual operation of the release mechanism. It is seen that drawing the upper end of the bell crank 56 in a counterclockwise fashion around its pivotal mounting accomplishes the same effective movement as driving the flange 82 in a counterclockwise fashion by the lever 84.

The system described herein finds particular utility in an environment where a parking brake should be released before movement of the vehicle is initiated. On vehicles having an automatic transmission with a selector lever of the type described herein, this releasing of the vehicle parking brake is accomplished automatically. Likewise, when the selector lever is placed into a park position where no further movement of the vehicle is desired, the parking brake is automatically applied. The system described herein has the added feature of being manually operable under conditions when the engine is not operating or when the transmission is in neutral.

It is obvious also that the subject invention finds utility in an environment where the first step in an operating sequence is necessary for completion before a second step is initiated. This operating situation might occur where power is applied to a mechanism that is normally maintained at a position of rest by a braking mechanism.

While the embodiment of the present invention, as herein disclosed, constitutes a preferred form, it is to be understood that other forms might be adopted.

What is claimed is as follows:

1. Parking brake mechanism for a vehicle having lever means for changing gears, said mechanism comprising: a pedal pendantly supported on a fixed portion of a vehicle and including a geared portion; power source means; connecting means between said pedal and a vehicle brake for transferring a force to hold the vehicle in a braked position; drive means including a pivotally supported gear connecting transferring force from said power source means to said pedal; pawl means held out of engagement with said geared portion during an actuating movement of the pedal and engaging said geared portion to maintain a relative position thereof after release of actuating movement; and brake releasing means for releasing said geared portion from an actuated position under one operating condition in response to a movement of the lever means for changing gears on the vehicle, said brake releasing means also including a pivotable lever for releasing said geared portion from an actuated position under a second operating condition.

2. Parking brake mechanism for applying a vehicle brake, the vehicle having a transmission control lever, said mechanism comprising: a brake pedal pendantly supported by a fixed portion of the vehicle and including a sector gear arcuately disposed about the pendant support; power source means including a worm drive; drive means engageable with said worm drive; power output means connected to a vehicle brake and adapted to engage said brake; linking drive means pivotally supported and adapted to selectively connect the drive means with the power output means in response to a movement of the transmission control lever to energize a vehicle brake; holding means adapted to engage the sector gear after brake actuation to hold the parking brake mechanism in an actuated condition; and releasing means including a pivotable lever for releasing the parking brake from an actuated position in response to a second movement of the transmission control lever, said pivotable lever including means for positioning said linking drive means and said holding means in operative engagement with the sector gear and responsive to a manually operated lever during operating conditions when the power source means is inoperative.

3. Parking brake mechanism for applying a brake for a vehicle at rest, said vehicle including a multi-position lever for controlling a transmission having first and second predetermined positions, said parking brake mechanism comprising: a brake pedal pendantly supported from a fixed portion of the vehicle and adapted to be pivotable thereon, said brake pedal including a sector gear arcuately mounted with respect to the pendant support; drive means engageable with said sector gear; linking drive means pivotally supported and engageable with said drive means; power source means including a pressure means and electrical means, said electrical means including a worm drive in driving relationship to said linking drive means and operable in response to a movement of the transmission control lever to the first predetermined position; said drive means engaging said sector gear being adapted to be selectively engaged by said linking drive means to transfer power between said electrical means and the sector gear to drive the brake pedal into a brake applied condition; releasing means including lever means and a manually pivotable arm, said lever means connected to said pressure means to release the brake in response to a movement of the transmission control lever to a second predetermined position; and holding means carried by the lever means and adapted to engage the sector gear after release of an actuation of the brake to prevent casual disengagement thereof, said holding means being manually disengageable during one condition of operation and disengageable from the sector gear by a force from the pressure means in response to a movement of the transmission control lever to the second predetermined position during a second condition of operation.

4. Parking brake mechanism according to claim 3 wherein the drive means comprises a first gear engaging the worm drive of the electrical means and a second gear mounted for rotation on the same shaft as the first gear.

5. Parking brake mechanism according to claim 4 wherein the linking drive means is a third gear mounted for rotation on a strap pivotally carried on the same center as the shaft carrying the first and second gear, said third gear being pivotable in and out of engagement with a portion of the drive means to selectively drive the brake pedal in a pivotal manner thereby engaging the vehicle brakes.

6. Parking brake mechanism according to claim 5 wherein the lever means is a bell crank pivotally supported by a fixed portion of the vehicle and is arranged to drive the third gear into force transmitting relation to the power output means when pivoted in one direction, said bell crank carrying the releasing means and is arranged to pivot the holding means out of engagement wtih the sector gear when pivoted in other directions.

7. Parking brake mechanism according to claim 5 wherein the holding means is a pivotable pawl member carried by the lever means and having resilient legs adapted to frictionally engage a surface of the sector gear to hold the pawl away from the sector gear during an actuating movement of the brake pedal, said pawl being pivotable into locking engagement with the sector gear when the actuating movement is complete and a small reverse movement takes place.

8. In a vehicle including a parking brake mechanism for applying a brake force to a vehicle to maintain the vehicle stationary and a transmission control lever having a park, a neutral, a reverse, and forward positions, said parking brake mechanism comprising: a brake pedal lever pendantly supported from a fixed portion of the vehicle and adapted to be pivotal in its mounting, said brake pedal lever including a sector gear at one end arcuately mounted with respect to the pendant support; power source means including an electrical motor having electrical controls connected with the transmission control lever to selectively energize the electric motor in response to movement of the transmission control lever to predetermined positions, said power source means including a vacuum responsive device operably connected with said transmission control lever and energized by the positioning of the transmission control lever to the reverse or drive positions, said electrical motor being energized by the movement of the transmission control lever to the park position, a worm gear driven by the electrical motor and disposed in driving relationship to a plurality of gears; said plurality of gears including a first gear being directly engageable with the worm gear and being rotatable on a shaft affixed to fixed portion of the vehicle; a second gear rotatable on the shaft of the first gear and adapted to be driven therewith; a third gear rotatable on a mounting carried by a fixed portion of the vehicle and arranged to be in engagement with the sector gear of the brake pedal; a bell crank pivotable about the axis of the third gear and including a pawl means engageable with said sector gear, force gear means pivotable about the axis of the first and second gears and ararnged to be rotatable on an axis carried by a strap engaging the pivotal axis of the first and second gear; said bell crank being adapted to selectively position the pivotable force gear into driving relationship to the third gear thereby providing a force transmission means between the electrical motor and the brake pedal gear sector; said bell crank normally being biased for engagement of the force gear in driving relationships with the second and third gear, said bell crank having a portion connected to said vacuum responsive device responsive to the positioning of the transmission control lever to release the brake from an actuation condition, and a pivotable release lever adapted to be moved into engagement with another portion of the bell crank to draw the pawl means out of engagement with the sector gear to provide a manual release of the brake after an actuation thereof, said pawl means being pivotally carried by the bell crank and including resilient clips contacting the sector gear on either side to provide a silent movement of the sector gear during an actuation and adapted to pivot the pawl means into engagement with the sector gear upon a release of actuating pressure.

References Cited by the Examiner

UNITED STATES PATENTS 2,910,156  10/1959  Apple _____ 192—4 X
3,003,605  10/1961  Apple _____ 192—4

DAVID J. WILLIAMOWSKY, *Primary Examiner.*

A. T. McKEON, *Assistant Examiner.*